United States Patent [19]

Choi

[11] Patent Number: 5,063,017

[45] Date of Patent: Nov. 5, 1991

[54] FLEXIBLE ARTICLES FORMED FROM POLYURETHANES BY RIM PROCESSES

[75] Inventor: Jae H. Choi, Carmel, Ind.

[73] Assignee: AT&T Laboratories, Murray Hill, N.J.

[21] Appl. No.: 502,597

[22] Filed: Mar. 30, 1990

[51] Int. Cl.$^5$ .............................................. B29C 45/46
[52] U.S. Cl. .................................. 264/328.6; 264/240; 528/85
[58] Field of Search ............... 264/328.6, 240; 528/60, 528/65, 85

[56] References Cited

U.S. PATENT DOCUMENTS

| | | | |
|---|---|---|---|
| 4,035,467 | 7/1977 | Campbell et al. | 264/331.19 |
| 4,316,991 | 2/1982 | Sperazza et al. | 521/174 |
| 4,338,408 | 7/1982 | Zimmerman et al. | 521/115 |
| 4,348,488 | 9/1982 | Zimmerman et al. | 521/115 |
| 4,540,768 | 9/1985 | Speranza et al. | 264/328.6 |
| 4,731,427 | 3/1988 | Younes | 264/328.16 |
| 4,752,207 | 6/1988 | Kaaden | 425/548 |
| 4,753,592 | 6/1988 | Kaaden | 425/547 |
| 4,781,570 | 11/1988 | Kaaden | 425/547 |
| 4,790,742 | 12/1988 | Kaaden | 425/548 |
| 4,793,794 | 12/1988 | Kaaden | 425/549 |
| 4,793,796 | 12/1988 | Kaaden | 425/572 |

OTHER PUBLICATIONS

Bangiband, Polyurethane, 1986-87 Modern Plastics Encyclopedia, p. 78; McGraw-Hill Inc.
Woods, Polyurethane, Modern Plastics Enc.; p. 122, McGraw-Hill Inc., 1988.
F. Melvin Sweeney in *Introduction to Reaction Injection Molding*, Technomic Publishing Company, 1979.

*Primary Examiner*—Jan H. Silbaugh
*Assistant Examiner*—Angela Ortiz
*Attorney, Agent, or Firm*—B. S. Schneider

[57] ABSTRACT

A wide variety of products are formed by compression molding of silicone materials. Although such articles are used in numerous applications, compression molding is expensive and exudation of unreacted monomers and oligomers tend to cause electrical contact failures. By employing specific polyurethanes formed from polyols and isocyanates, it is possible to form articles by reaction injection molding. This process is substantially cheaper than compression molding and yet the same properties obtainable with silicones are attained.

7 Claims, 1 Drawing Sheet

FLEXIBLE ARTICLES FORMED FROM POLYURETHANES BY RIM PROCESSES

BACKGROUND OF THE INVENTION

1. Field of the Invention

This invention relates to flexible articles and, in particular, flexible articles formed from polyurethanes.

2. Art Background

A variety of consumer products are formed from poly(dialkyl siloxanes)--materials generally denominated silicones. Exemplary of products employing silicones are those having touch sensitive screens or pads that allow users, for example, to select options from a video screen, to dial touch pad telephones or to input computer data. In such applications, the silicones are chosen to furnish a resiliency necessary for deformation to produce a desired result (the selection of or input of data) followed by a return to the original configuration to prepare for subsequent input. Indeed, typically a flexibility in the range 30 to 70 Shore A hardness is considered quite desirable for such applications. (Shore A hardness is defined in ASTM (American Standard Testing Method) D2240.)

The resilient material, e.g. silicone, is typically formed into the desired shape, e.g. tough pad or screen, by compression molding. In this fabrication process a sheet of the silicone is subjected to a mold under high pressure causing permanent deformation of the material sheet into the mold configuration. Although this technique has been widely used, the process is relatively expensive because it includes extensive manual operations, e.g., mixing, compounding, sheeting and vulcanization.

Additionally, there is growing evidence that silicone materials, despite acceptable performance, lose flexibility and stability over extended time periods. Additionally the unreacted oligomers in the silicone tend to exude during use causing electrical contact failure. Thus, it is desirable to find a processing technology for forming resilient products that avoids the expense of compression molding and the difficulties associated with silicone materials.

SUMMARY OF THE INVENTION

By employing reaction injection molding (RIM) to form a flexible article from polyurethane materials, processing costs relative to compression molding of silicones are substantially reduced while material characteristics are improved. Reaction injection molding is accomplished by mixing liquid polyurethane precursors just before introduction of the precursor into an injection mold. Use of liquid materials with subsequent curing allows rapid production of the desired article. By employing precursors including (1) a polyol, e.g. a polymeric material having a plurality of hydroxyl moieties, and (2) a multifunction, e.g. difunctional, isocyanate such as an isocyanate derived from diphenyl methanol or other diphenylalkanes or their homologues quite desirable flexibility and stability properties are achieved.

DETAILED DESCRIPTION

Figure 1:
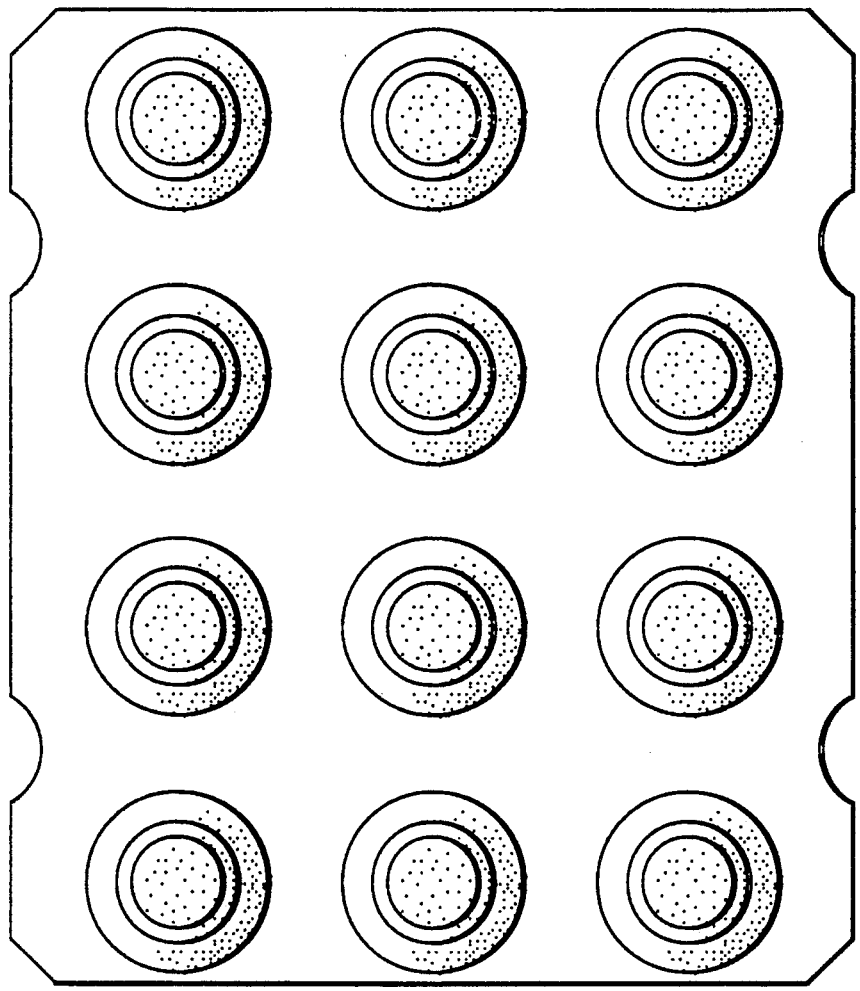
FIGS. 1 and 2 are illustrative of articles involved in the invention.

As discussed, flexible articles (articles having a flexibility in the range 30 to 70 Shore A hardness) are formed by reaction injection molding. In this process, liquid polymer precursors are mixed immediately before introduction into a mold. The mold typically involves a common area where the mixed liquid precursors are introduced with runners emanating from this area into cavities having the geometry associated with the article to be formed. The liquids introduced into the common area are forced through the runners and into the cavities where they cure in the desired shape. Reaction injection molding is a conventional technique and is fully described by F. Melvin Sweeney in *Introduction to Reaction Injection Molding*, TECHNOMIC Publishing Company, 1979. Additionally, a variety of patents such as U.S. Pat. Nos. 4,752,207 (June 1988), 4,790,742 (Dec. 1988), 4,793,794 (Dec. 1988), 4,793,796 (Dec. 1988), 4,753,592 (June 1988), and 4,781,570 (Nov. 1988) which are hereby incorporated by reference, disclose equipment suitable for such molding. Typical injection pressures in the range 1000 to 3000 psi with mold temperatures in the range 23° to 93° C. are employed.

By use of specific polyurethanes, molding times as short as 60 seconds are achieved while the resulting product has a flexibility in the range 30 to 70 Shore A hardness and demonstrates a lifetime of over one million deformation cycles. (A deformation cycle includes deformation of the product and the subsequent return to the original conformation.) Additionally, these materials will undergo more than one quarter million deformation cycles without a stress crack and without substantial change in the force required for operation.

In particular, the advantageous polyurethanes produced during reaction injection molding are formed from a polyol, a di or poly isocyanate and, if desired, a chain extender. The relative ratio of the components depends on the particular flexibility desired. Generally for flexibilities in the range 30 to 70 Shore A hardness, polyol to isocyanate mole ratios in the range 17:1 to 5:1 are employed. Ratios below 5 yield undesirable mechanical rigidity while mole ratios greater than 17 yield a gummy material lacking mechanical integrity.

Although it is possible to form perfectly acceptable materials from a polyol and isocyanate without a chain extender, the desired relatively high ratio of polyol to isocyanate tends to make difficult, accurate measurements of the appropriately small quantities of isocyanate. To avoid the inconveniences associated with these ratios, it is possible to reduce the amount of polyol to isocyanate by employing a chain extender. Typically, the amount of isocyanate is increased by 0.0320 equivalent weight for one percent (by weight) of chain extender that is employed. Surprisingly by use of appropriate chain extenders the properties of the ultimate products are not substantially affected.

The polyol is advantageously a polymeric material having a plurality of hydroxyl moieties. Typically, the hydroxyl number of the polyol (the amount in milligrams of KOH equivalent to the hydroxyl content of 1 gram of the polyol) should be in the range 20 to 30. Typically the polyol should have a molecular weight in the range 40,000 to 60,000. Molecular weights less than 40,000 yield weak polymer while molecular weight greater than 60,000 produce high modulus polymer. As previously discussed, the resulting polyol is a liquid that should preferably have a vapor pressure less than 1 psi.

The isocyanate material should be polyfunctional, e.g. difunctional, and typically should preferably be derived from diphenyl methane, a diphenylalkane, or their homologues e.g., a material such as 4,4'-diphenylmethane diisocyanate (MDI) having the general formula

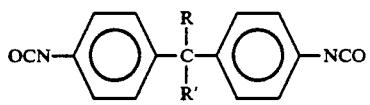

where R and R' are independently lower alky or hydrogen and where substitution on the phenyl moieties is acceptable provided such substitution does not result in a solid or gaseous material.

Chain extenders are typically hydroxy terminated organic monomers and oligomers. For example, hydroxy terminated 1,3-butadiene homopolymer or poly functional alcohols preferably diols that are not extensively branched are suitable as chain extenders. Typically molecular weights for the chain extenders should be in the range 62 to 5000. Molecular weights higher than 5000 tend to produce rigid and high modulus products while molecular weights below 62 are generally not efficacious. The chain extenders should also be a liquid and should be hydroxyl terminated. Exemplary of other chain extenders are ethylene glycol, propylene glycol, tetramethylene glycol, and 1,4-butanediol oligomers.

A catalyst to induce reaction between the precursors of the polyurethane should be employed. Typically, a combination of an organometallic catalyst with an amine catalyst is advantageously employed. Generally the catalyst concentration should be in the range 0.75 to 0.95 percent by weight. Concentrations greater than 0.95 are not desirable because they produce rapid gelling and concentrations less than 0.75 lead to inadequate polymerization. The ratio between the organometallic material and the amine should be in the range 4:1 to 8:1. An excessive amount of organometallic produces unacceptable cream time, i.e. the time to gel. Excessive amounts of amine catalyst degrades green strength, i.e. the strength of the material as initially formed during demolding. Typical amine catalysts include reactive amine and hydroxyl functional groups such as $H_2NCH_2CH_2OH$, triethylene diamine, tetramethylene diamine, pentamethylene diamine, hexamethylene diamine, heptamethylene diamine, and bis(2-dimethyl aminoethyl) ether while typical organometallic catalyst include tin complexes such as $(C_4H_9)_2Sn[OOC(CH_2)_{10}CH_3]_2$, stannous octoate, and dibutyltin di-2-ethylhexoate.

Various additives to the polymer are acceptable. For example, stabilizers such as a UV absorber and/or an antioxidant, flame retardant filler such as antimony trioxide and aluminum trihydrate and organic and inorganic dyes for coloring are acceptably employed. The percentage of such additives in the final composition should generally be limited to less than 0.1 to 5 percent by weight. Greater percentages typically degrade properties of the polyurethane and increase the liquid viscosity.

The following examples are illustrative of reaction conditions and polyurethane precursors employed in the invention.

EXAMPLE 1

Polyol (alkenyl modified oxyalkylene polymer, e.g., NIAX E -701 from Union Carbide Chemicals), organometallic accelerator (dibutytin dilaurate, e.g. DABCO T-12 from Air Products), amine catalyst (triethylene diamine and diol ether, e.g., DABCO 33-LV, from Air Products) and chain extender (butadiene homopolymer, e.g., POLY BD R-45 HT from Sartomer Corporation) were mixed in one vessel, and isocyante was mixed in a second vessel. The first vessel components included 83 grams of polyol, 0.33 grams of organometallic accelerator, 0.16 grams of amine catalyst and 0.83 grams of chain extender. Typically, 10 grams of isocyanate (MDI) was mixed with 84.32 grams of polyol containing mixture. Each vessel was pressurized under 60 psi atmosphere of nitrogen. (Nitrogen was needed to keep moisture away from both polyol and isocyanate materials.) Materials in both vessels were circulated independently throughout its own vessel. In this way, components stored in the two vessels did not meet each other until injection was initiated.

Figure 2:
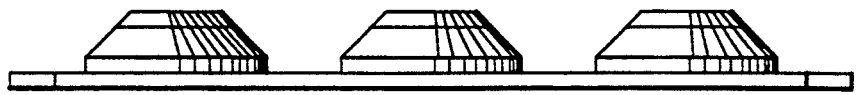

A HP122P270 mixing head from HI-TECH Engineering, Inc., Grand Rapids, Mich., USA was attached to a 9-cavity aluminum mold with each cavity defining a touch pad such as shown in FIGS. 1 and 2. The RIM mold employed for this invention included an after-mixer (peanut mixer), runner, gate and cavity. The after-mixer provided additional mixing of polyol and isocyanate as they left the impingement chamber of the mixer. The runner and gating devices provided a path from the mixing head to the mold cavity which determines the shape, size, and geometric configuration of the touch pad to be molded. A fan gate was found to produce a better touch pad than a dam gate. It is believed that the high viscosity and large mixing ratio of the material system is better handled by the fan gate. It was possible to use differently configured touch pads in the same mold without cavity filling imbalance. The mold temperature was maintained at 140° F. The temperature in the component vessels was kept constant at 90° F. The component ratio, cream time, injection time, demold time and recycle time after demolding the parts were controlled by a microprocessor.

At injection, the mixing ratio of polyol mixture and isocyanate was 8.2 to 1. Injection time was 0.5 seconds and curing time was less than 60 seconds. Parts were removed manually from the mold. The parts had a flexibility of 35 Shore A.

I claim:

1. A process for forming a flexible article, said process comprising the steps of (1) introducing at least two reactive fluids into an injection mold, (2) directing said fluids into a cavity in said mold wherein said cavity defines the shape of said article and (3) allowing the composition resulting from the combination of said fluids to cure in said shape, wherein said fluids react to form said flexible article and include a polyol and an isocyanate represented by the formula:

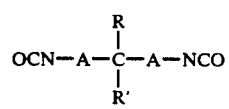

where R and R' are independently hydrogen or lower alkyl and where A is a substituted or unsubstituted phenyl group and where a mole ratio of said polyol to said isocyanate is in the range 17:1 to 5:1.

2. The process of claim 1 wherein said polyol comprises a polymeric material with a hydroxyl number in the range 20 to 30.

3. The process of claim 2 wherein said polymeric material has a molecular weight in the range 40,000 to 60,000.

4. The process of claim 1 wherein said article comprises a telephone touch pad.

5. The process of claim 1 wherein said fluids includes a multifunctional alcohol in addition to said polyol.

6. The process of claim 5 wherein said fluids include a polymerization catalyst.

7. The process of claim 1 wherein said fluids include a polymerization catalyst.

* * * * *